United States Patent
Neubauer et al.

(10) Patent No.: US 11,708,226 B2
(45) Date of Patent: Jul. 25, 2023

(54) METHOD FOR FORMAT ADAPTATION OF CARRIAGES ON A LINEAR MOTOR SYSTEM, AND LINEAR MOTOR SYSTEM

(71) Applicant: KRONES AG, Neutraubling (DE)

(72) Inventors: Michael Neubauer, Grassau (DE); Stefan Poeschl, Sinzing (DE); Bruno Landler, Neutraubling (DE); Wolfgang Roidl, Deuerling (DE)

(73) Assignee: KRONES AG, Neutraubling (DE)

( * ) Notice: Subject to any disclaimer, the term of this patent is extended or adjusted under 35 U.S.C. 154(b) by 113 days.

(21) Appl. No.: 17/415,686

(22) PCT Filed: Nov. 12, 2019

(86) PCT No.: PCT/EP2019/080931
§ 371 (c)(1),
(2) Date: Jun. 17, 2021

(87) PCT Pub. No.: WO2020/126218
PCT Pub. Date: Jun. 25, 2020

(65) Prior Publication Data
US 2022/0073290 A1    Mar. 10, 2022

(30) Foreign Application Priority Data
Dec. 21, 2018   (DE) ............. 10 2018 222 786.1

(51) Int. Cl.
*B65G 54/02*      (2006.01)
*B67C 3/24*       (2006.01)
(Continued)

(52) U.S. Cl.
CPC .......... *B65G 54/02* (2013.01); *B65G 47/842* (2013.01); *B65G 47/847* (2013.01); *B67C 3/24* (2013.01);
(Continued)

(58) Field of Classification Search
CPC .... B65G 54/02; B65G 47/842; B65G 47/847; B65G 2201/0244; B65G 2201/02
(Continued)

(56) References Cited

U.S. PATENT DOCUMENTS

2015/0353297 A1   12/2015   Fahldieck et al.
2016/0376105 A1   12/2016   Raffaini et al.

FOREIGN PATENT DOCUMENTS

| | | | |
|---|---|---|---|
| CA | 1078773 A | 6/1980 | |
| CN | 104781148 A | * 7/2015 | ............. B65G 54/02 |

(Continued)

OTHER PUBLICATIONS

ISA European Patent Office, International Search Report Issued in Application No. PCT/EP2019/080931, dated Feb. 19, 2020, WIPO, 8 pages.

*Primary Examiner* — James R Bidwell
(74) *Attorney, Agent, or Firm* — McCoy Russell LLP

(57) ABSTRACT

A method for format adaptation of carriages for the transportation of bottles on a linear motor system and a corresponding linear motor system are described. According thereto, container guides provided on the carriages are adapted to the body cross-section of the bottles by adjusting a guide width in an automated manner between guide jaws of the container guides which in relation to the direction of travel are the leading and trailing ones. There is then no need to replace component parts at the container guides, and the production in filling systems is optimised in terms of staff requirements, resultant production stoppages, and error sources.

19 Claims, 3 Drawing Sheets

(51) Int. Cl.
*B65G 47/86* (2006.01)
*B67C 3/26* (2006.01)

(52) U.S. Cl.
CPC .. *B65G 2207/08* (2013.01); *B67C 2003/2668* (2013.01)

(58) Field of Classification Search
USPC ..................................................... 198/470.1
See application file for complete search history.

(56) References Cited

FOREIGN PATENT DOCUMENTS

| | | | | |
|---|---|---|---|---|
| DE | 102010009364 A1 | 8/2011 | | |
| DE | 10 2011 086708 A1 | * 5/2013 | .............. | B65C 9/02 |
| DE | 102012209978 A1 | 12/2013 | | |
| DE | 102014226965 A1 | 6/2016 | | |
| DE | 102015115729 A1 | 3/2017 | | |
| EP | 2479008 | * 7/2012 | ............. | B65B 21/18 |
| EP | 2907777 A1 | 8/2015 | | |
| WO | 2013189656 A1 | 12/2013 | | |
| WO | 2014108287 A1 | 7/2014 | | |
| WO | 2015082381 A2 | 6/2015 | | |
| WO | 2018162145 A1 | 9/2018 | | |
| WO | 2019/159116 | * 8/2019 | ............... | B65C 9/04 |

* cited by examiner

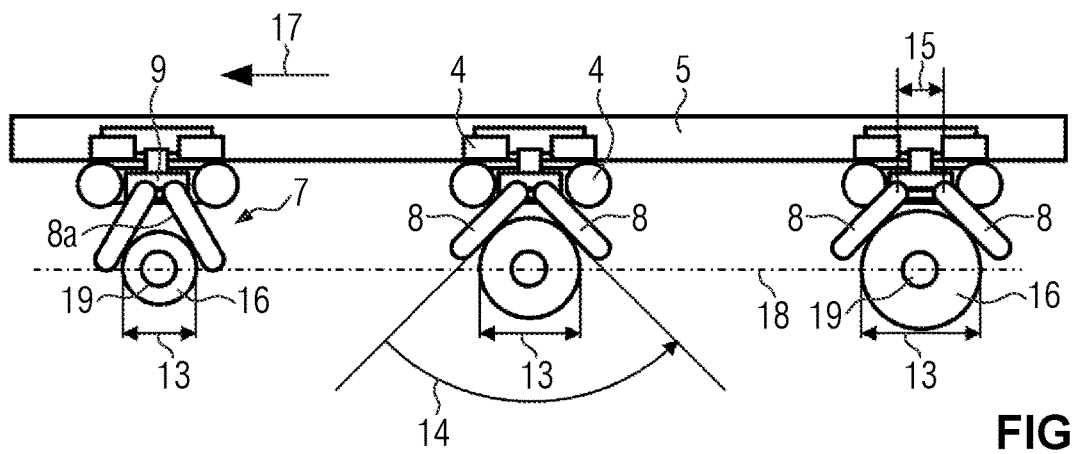
FIG. 2
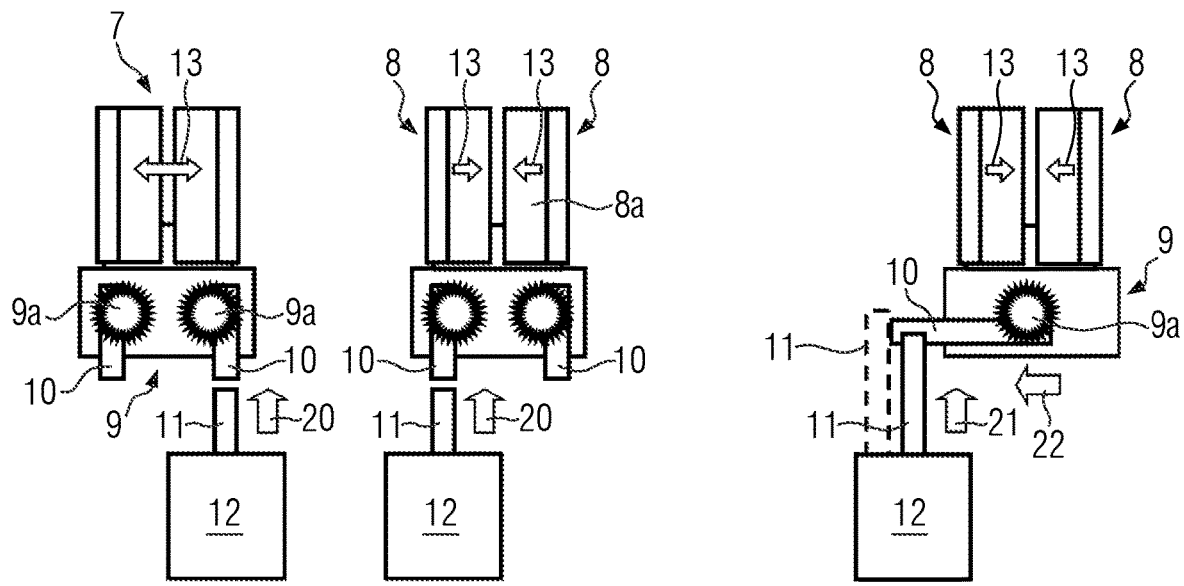
FIG. 3
FIG. 4
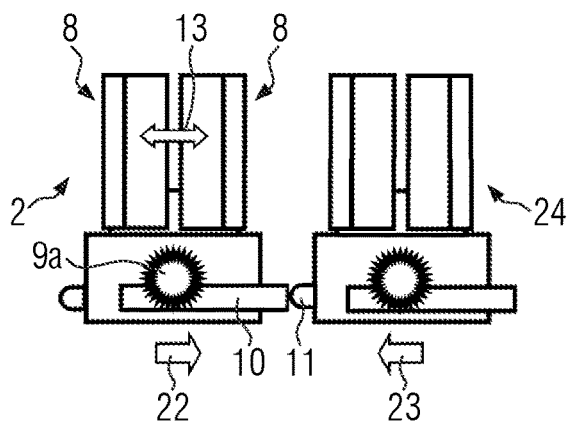
FIG. 5

METHOD FOR FORMAT ADAPTATION OF CARRIAGES ON A LINEAR MOTOR SYSTEM, AND LINEAR MOTOR SYSTEM

CROSS REFERENCE TO RELATED APPLICATIONS

The present application is a U.S. National Phase of International Application No. PCT/EP2019/080931 entitled "METHOD FOR FORMAT ADAPTATION OF CARRIAGES ON A LINEAR MOTOR SYSTEM, AND LINEAR MOTOR SYSTEM," and filed on Nov. 12, 2019. International Application No. PCT/EP2019/080931 claims priority to German Patent Application No. 10 2018 222 786.1 filed on Dec. 21, 2018. The entire contents of each of the above-listed applications are hereby incorporated by reference for all purposes.

TECHNICAL FIELD

The invention relates to a method for format adaptation of carriages for the transportation of bottles or similar containers on a linear motor system and a corresponding linear motor system.

BACKGROUND AND SUMMARY

In beverage filling systems, different container formats, i.e., containers which differ in terms of their size, shape, capacity and the like, are often to be processed on one and the same machine. In order for the machine to operate reliably and properly, it typically has to be set up to match the individual container formats. For example, retaining clips for suspended transportation of the bottles, associated container guides for the side walls of the bottles, guide arches of transport routes or the like must match the respective container shape and container size. The adaptation is then mostly made by exchanging so-called retooling parts. This refers to all the components of a machine, the shape of which depends on the container format being processed. For example, in order to retool a machine from containers having a capacity of 0.5 liters to containers having a capacity of 1.5 liters, retooling parts for guiding the containers must be exchanged.

The drawback there is that a large number of different retooling parts have to be kept available for the individual container formats, which results in investment costs and space requirements for storing the retooling parts. The retooling typically requires manual activities and corresponding personnel costs as well as a machine downtime with a corresponding reduction in productivity. In addition, errors in the retooling work causing damage and loss of production are possible.

In order to reduce the retooling effort, it has already been proposed to replace the rotary machines, which are particularly complex in this regard, with linear motor systems having supports and container guides attached to carriages for the containers. Complex infeed star wheels, discharge star wheels, or the like can then be dispensed with. In linear motor systems, as is known, carriages individually driven by long stators move along guide rails and generally hold the containers at their neck and/or neck finish regions with retaining clips for base-free neck handling. Linear motor systems for body or base-supported handling of the containers are also known.

While the neck finish regions are dimensioned to be largely uniform, in particular for plastic containers produced in a stretch blow-molding process, and can be held by the same retaining clips, specially adapted container guides must be attached to the carriages below the retaining clips for each container format. These are generally guide shells which are open on one side and which are in particular configured substantially as a negative of the side wall contour of the respective container format.

In order to eliminate or alleviate the above-mentioned problems, it would be desirable to further reduce the costs of retooling work on linear motor systems or to be able to do without retooling at all.

There is therefore a need for methods improved in this regard for adapting the format of carriages for the suspended or standing transportation of bottles on a linear motor system and for a correspondingly improved linear motor system.

The object posed is satisfied by a method according to claim 1. The method is used for format adaptation of carriages for the transportation of bottles or similar containers on a linear motor system in a suspended or standing manner.

According thereto, container guides present on the carriages are adjusted to a neck/shoulder/body cross section of the containers/bottles by adjusting a guide width in an automated manner between guide jaws of the container guides which in relation to the direction of travel are the leading and trailing ones.

Additionally or alternatively, the container guides are adapted to the neck/shoulder/body cross-section by adjusting a height level of at least one guide jaw present on the container guides in an automated manner and in particular a vertical distance between the upper and lower guide jaws of the container guides.

By definition, the container guides are configured to guide and/or passively grip the neck/shoulder/body regions.

The automated adjustment makes it unnecessary to exchange the container guides for format adaptation. Automated adjustment is presently to be understood as meaning that the guide jaws of the container guides are adjusted by machine by way of at least one electronically, pneumatically and/or hydraulically controlled drive. Its actively driven components are there arranged outside the carriages, for example, at an adjustment station arranged in the region of the linear motor system and/or in the stators of the linear motor system.

It is also possible to adjust retaining clips for neck finish regions of the containers in an automated manner. The contour of the retaining clips, but also their opening width, can in principle be adjusted in the same manner as is described for the guide jaws. The retaining clips are adjusted, for example, when changing the format between narrow-necked bottles and wide-necked bottles.

In general, all parts on the carriage that are specific to container formats can be configured in such a way that they are formed to be adaptable accordingly.

In the case of round container cross-sections, the guide width can be defined, for example, by the diameter of the body. In the case of specially shaped bottles, i.e. bottles with a non-circular cross-section, the guide width can be understood more generally as being the dimension of the body cross-section along a vertical plane in which the longitudinal axis of the container and the transport direction of the container are disposed.

During the vertical adjustment, for example, the guide jaws can be raised or lowered by container guides that are single-part in the vertical direction. It is also possible to raise or lower only a single or several guide jaws on container guides that are multi-part in the vertical direction. If not all guide jaws are adjusted vertically in the same way, then a vertical distance changes between guide jaws of the container guides which in the direction of travel are the lower and upper ones.

For example, upper guide jaws for neck and/or shoulder regions of bottles as well as lower guide jaws for body regions of the bottles can be provided on vertically two-part container guides. In the case of suspended transportation, the adjustment of the upper guide jaws is then typically not necessary or only necessary to a relatively small extent, whereas the lower guide jaws are moved up or down to match the new container length. In the case of standing transportation, the upper guide jaws would then have to be moved up or down in the opposite way.

In general, it would also be possible to adjust a lateral distance of the container guides from the linear motor system in an automated manner, i.e. the guide jaws transverse to the direction of travel.

An operating element is approached preferably in an automated manner to the respective carriage and thereby brought into operative connection with an actuating mechanism coupled to the guide jaws. The operating element is therefore not part of the carriage to be adjusted, but can be formed on a further carriage. The actuating mechanism of the carriage therefore works passively. This simplifies the structure of the carriage, in particular to the effect that the carriage does not have to be supplied with drive energy for adjusting the container guides.

An operative connection is to be understood as meaning that the approached operating element itself performs an adjustment motion transmitted from the actuating mechanism to the guide jaws or acts as a stationary anchorage for the actuating mechanism during an adjustment motion, in particular adjustment travel.

The carriages are preferably driven into the region of an adjustment station, and the adjustment station carries out an adjustment motion with the operating element for adjusting the guide jaws. This means that the adjustment motion of the operating element is converted by the actuating mechanism into a motion of the guide jaws relative to one another that changes the guide width. The adjustment station is then arranged in a stationary manner in the region of the linear motor system.

The carriages are preferably driven into the region of an adjustment station, and the adjustment station moves the operating element up to a position for anchoring a coupling element in a stationary manner which is drive-coupled to the actuating mechanism. Immediately afterwards, the carriage conducts an adjustment run that is transmitted by the actuating mechanism to the guide jaws. The coupling element then acts as a stationary counter-bearing for the actuating mechanism. The travel distance of the adjustment run there determines the adjustment of the guide jaws.

The adjustment station then only has to perform a comparatively simple actuating motion, namely couple the operating element with the coupling element in a positive-fit manner and/or position the operating element as a mechanical stop for the coupling element. The more complex adjustment motion for the guide jaws is then carried out by the linear motor system with the adjustment run.

In a further advantageous embodiment, the operating elements are arranged on the carriages, and two carriages move onto one another in such a way that the actuating mechanism and therefore the guide jaws of one carriage are adjusted by the operating element of the other carriage. For example, the actuating mechanism of a first carriage is actuated when a second carriage drives thereto by the latter's operating element, and the guide jaws of the first carriage are thereby adjusted. Conversely, it would also be possible for the guide jaws of the driving carriage to be adjusted, or for both carriages to move onto one another during the adjustment.

In other words, the actuating motion is preferably generated by at least one adjustment run of a carriage in which two carriages are moved onto one another with the coupling element clamped therebetweern. One of the carriages can rest there.

The operating elements can be, for example, projections formed on the face side of the carriages or any regions of the face sides of the carriages. The respective operating element of one carriage is drive-coupled via the coupling element of the other carriage with the latter's actuating mechanism. The adjustment run can then be conducted by the one and/or the other carriage. Consequently, an additional drive for adjusting the guide jaws is dispensable. The actuating motion for the guide jaws is effected and controlled exclusively by the linear motor system.

The guide width is preferably adjusted by changing a horizontal angle of attack between the guide jaws and/or by shifting the guide jaws with respect to the carriage parallel relative to its direction of travel. This enables simple and flexible adaptation of the guide width without exchanging the guide jaws.

The carriages can optionally be temporarily diverted to a shunting section of the linear motor system for format adaptation. A stationary adjustment unit can be arranged there independently of the normal transport operation of the linear motor system. For example, the adjustment station can be specially configured for empty carriages, i.e. without having to take into account a potential collision with transported containers. The adjustment station can consequently be adapted even better to the requirements for adjusting the guide width. It would also be conceivable to keep special carriages available on the shunting section for format adaptation, i.e., carriages on which special operating elements are configured for conducting adjustment runs.

This object posed is also satisfied by a linear motor system according to claim 8. According thereto, it is suitable for the suspended or standing transportation of bottles and comprises individually driven carriages with container guides for the bottles, where the container guides comprise guide jaws that are leading and trailing with respect to the direction of travel and/or lower and upper guide jaws as well as an actuating mechanism for adjusting a guide width and/or a vertical distance between the guide jaws by way of an operating element acting from the outside according to at least one of the preceding embodiments.

The guide jaws are preferably mounted individually to be pivotable about vertical axes and/or are mounted displaceable against each other parallel to the direction of travel of the carriage. This enables the adjustment of the guide jaws relative to one another, which is simple to implement, with an operating element acting upon the actuating mechanism from outside the carriage.

The guide jaws preferably comprise vertically aligned and in particular substantially planar guide surfaces for the body regions of the bottles. A plurality of different container cross-sections, in particular round and non-round container cross-sections, can be thus guided reliably.

The actuating mechanism preferably comprises at least one ratchet mechanism for, in particular, incrementally increasing and reducing the guide width. In a known manner, the ratchet mechanism comprises, for example, a toothed ring with a locking device that can be engaged and disengaged. The ratchet mechanism can also comprise a switchover mechanism with which the freewheeling direction and the blocking direction of the ratchet mechanism can be reversed. A ratchet mechanism enables unidirectional operation of the actuating mechanism.

The carriages preferably comprise coupling elements which are to be actuated from below or in/opposite to the direction of travel and which are drive-coupled to the actuating mechanism. The coupling elements serve to transmit an actuating motion from the respective operating element to the actuating mechanism or a stationary anchoring of the actuating mechanism such that the guide jaws are adjustable by a relative motion of the carriage with respect to the stationarily anchored coupling element.

The coupling elements can be, for example, linearly displaceable bolts, rotatable shafts, or spindles. The operating elements can be arranged on matching linear units, rotary drives, or spindle drives.

In the case of rotary drives, operating elements and coupling elements can comprise structures for torque transmission that engage with one another in a positive-fit manner like, for example, with a crosshead screw and a crosshead screwdriver or the like.

Coupling elements and operating elements that work linearly can have corresponding elevations and recesses, as well as matching hooks and eyes or the like.

In principle, however, other motions and mechanisms are also conceivable, for example, by way of lever-shaped coupling elements The linear motor system preferably further comprises an adjustment station in the region of a track for the carriages arranged in a stationary manner for the motorized actuation or anchoring of a coupling element of the actuating mechanism. A single adjustment station is then only required to adjust all of the carriages.

The linear motor system preferably further comprises an adjustment station arranged in a stationary manner for the carriages in the region of a track, in particular a shunting section, for the motorized actuation or anchoring of a coupling element mounted on the carriage and drive-coupled to the actuating mechanism. This makes it possible to provide a particularly simple adjustment station for adjusting all of the carriages.

The operating element and the coupling element are preferably configured for a magnetic force fit for unlocking the actuating mechanism by approaching the operating element and for driving the actuating mechanism by a stroke and/or a rotation of the operating element. This is possible without contact and without the use of surfaces that are difficult to clean and is therefore particularly hygienic.

For example, a magnet present at the operating element can be moved in a motorized manner by a stationary or mobile unit toward the coupling element in order to have the latter release a locking mechanism for the actuating mechanism present in the carriage by undercutting a threshold distance to the carriage.

The guide width of at least one pair of guide jaws can preferably be changed by subsequent rotation of the magnet. In addition or as an alternative, the height level of guide jaws and/or the vertical distance between guide jaws arranged one above the other can be changed by the stroke, in particular vertical stroke, of the magnet.

According to a preferred embodiment, the magnet can be an electromagnet, so that the changeover work can be carried out independently of precisely defined distances or complicated motion profiles by simply switching the magnet on or off.

When the magnet is configured as an electromagnet as well as a permanent magnet, the width of the guide jaws and the height level can be adjusted simultaneously, because the magnet performs both the motion for the width adjustment (e.g. rotary motion) as well as the motion for the height adjustment (vertical motion).

BRIEF DESCRIPTION OF THE FIGURES

Preferred embodiments of the invention are shown by way of drawings, where

FIG. 2 shows a schematic top view onto the carriages with guide jaws at different guide widths;

FIG. 3 shows a schematic representation of a first embodiment of the method;

FIG. 4 shows a schematic representation of a second embodiment of the method;

FIG. 5 shows a schematic representation of a third embodiment of the method;

DETAILED DESCRIPTION

Figure 1:
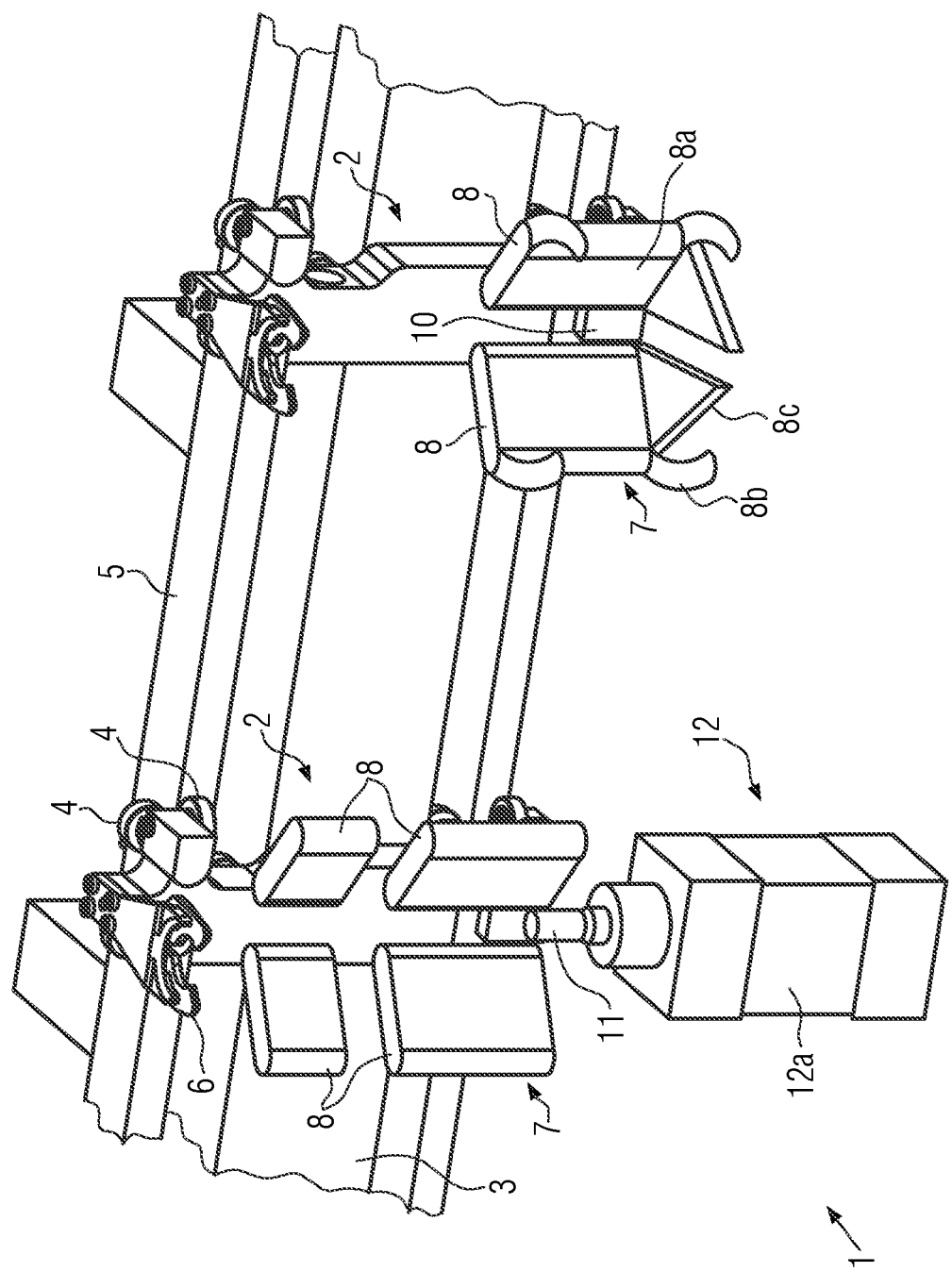
FIG. 1 shows view at an angle of a linear motor system.

As shown in FIG. 1, linear motor system 1 comprises carriages 2 which are individually driven by long stators 3 and run along guide rails 5 of linear motor system 1 by use of guide rollers 4. This is basically known just like retaining clips 6 present on carriages 2 for the suspended transportation of containers, such as, for example, beverage bottles, at their neck finish regions and/or neck regions.

Carriages 2 further comprise container guides 7 adjustable in an automated manner for the body regions and/or neck/shoulder regions of the containers to be transported. Container guides 7 comprise guide jaws 8 that can be adjusted relative to one another, for example, lower ones for the body regions and upper ones for the neck/shoulder regions, as well as a passive actuating mechanism 9 with a coupling element 10 for an operating element 11 that can be approached in an automated manner from the outside. Actuating mechanism 9 is drive-coupled to guide jaws 8 coupled in order to adapt them to the body regions and/or neck/shoulder regions of the containers.

Operating element 11 is presently part of an adjustment station 12 which is arranged in the region of linear motor system 1 in such a way that operating element 11 can be moved toward coupling element 10 and can be operatively drive-coupled thereto. Adjustment station 12 is shown in a simplified manner without associated fastening devices.

Adjustment station 12 comprises a drive 12a for operating element 11, which is controllable in an automated manner, such as electronically, pneumatically, hydraulically or the like, for example, with a spindle drive for performing a combined rotational motion and a translation of operating element 11. Operating element 11 can be moved upwardly in this manner in order to push coupling element 10 upwardly and/or to rotate it. Operating element 11, however, could also perform only a rotational motion or a motion suitably overlaid by several degrees of freedom.

Operating element 11 can there possibly interact with coupling element 10 in a positive-fit manner. For example, there can be correspondingly interengaging face sides present on operating element 11 and on coupling element 10, which is basically known and is therefore not explained in more detail in this context.

With an operating element 11 acting in a positive-fit manner, coupling element 10 can alternatively also be anchored in a stationary manner for adjusting container guides 7. As shall be explained hereafter, carriage 2 then conducts an adjustment run adjusting guide jaws 8 relative to coupling element 10 anchored in a stationary manner.

In a schematic top view onto a pair of guide jaws 8, FIG. 2 illustrates the working principle of container guides 7 that are adjustable in an automated manner, for example, the lower pair of FIG. 1, for the sake of clarity without retaining clips 6. According thereto, a guide width 13 of container guides 7 can be adapted to different body cross-sections 16 or neck/shoulder cross-sections of the containers by adjusting an angle of attack 14 and/or a distance 15 between guide jaws 8.

Guide width 13 is generally defined, for example, with respect to a dimension of body cross-section 16 or the neck/shoulder cross-section along a vertical plane 18 that is parallel to direction of travel 17 and runs through the central axes of the containers. In the special case presently shown for round body cross-sections 16 or neck/shoulder cross-sections, guide width 13 can also be defined by the diameter of respective body cross-section 16 or the neck/shoulder cross-section to be guided.

Guide jaws 8 are mounted on carriages 2 in relation to direction of travel 17 in pairs one behind the other. As a result, body regions 16 or the neck/shoulder cross-sections are guided both at an angle from the front and back as well as at an angle transverse to direction of travel 17.

Guide surfaces 8a of guide jaws 8 are preferably aligned in a planar and vertical manner. A plurality of different body cross-sections 16 can then be guided both in/opposite to direction of travel 17 and transverse thereto.

It is only indicated schematically for right-hand carriage 2 in FIG. 1 by way of example that guide jaws 8 can also comprise gripping elements 8b in addition to guide surfaces 8a, for example, to stabilize filled containers in the upright transport position. Gripping elements 8b are configured, for example, as elastic gripping fingers. Guide jaws 8 can then operate as passive gripping jaws.

During the feeding process, the containers can be, for example, first guided transverse to direction of travel 17 against guide surfaces 8a, there press gripping elements 8b outwardly, and finally snap into container guide 7 downstream of gripping elements 8b springing back inwardly.

As an alternative, it is also possible to configure guide surfaces 8a as contoured guide surfaces (presently not shown) in order to be able to make the guide of the container to be transported even more effective in that the guide hugs the contour of the container. This contoured guide surface is configured as a negative of the container outer contour.

It is only schematically indicated in FIG. 1 for the right-hand carriage 2 that guide jaws 8 can also comprise lower guide elements 8c for the base regions of the containers in addition to guide surfaces 8a for body cross-sections 16 or the neck/shoulder cross-sections. Lower guide elements 8c can be configured, for example, as rigid/immovable support plates for standing transportation of the containers, or they can serve only as guide surfaces for guiding the base regions of the containers in a substantially orthogonal manner.

Regardless of the type of transportation, lower guide elements 8c can generally be configured to mechanically relieve guide surfaces 8a and their actuating mechanisms and/or gripping elements 8b, for example, in that guide elements 8c absorb part of the weight force and/or inertia force arising at the container.

In order to facilitate barrier-free insertion of the containers into container guides 7, guide elements 8c can comprise insertion ramps or the like which are inclined downwardly away from carriage 2.

According to a further development of the invention, weight force measuring sensors are attached in or on guide elements 8c and/or on retaining clips 6 for determining the weight force of the container. Deductions can be derived therefrom, such as the correct filling of a container (after filling), the empty weight of the container (prior to filling). The empty weight can be of interest, for example, for determining the container format or the type of container (e.g. 0.3-liter container or 1.0-liter container) and to derive deductions therefrom for the correct setting of the carriages and their guide elements. For this purpose, the information is transmitted to a control unit, such as the machine control device, and further processed.

As shown in FIG. 2, the position of neck finish/neck regions 19 of the containers and therefore the position of retaining clips 6 preferably does not change when guide width 13 is adjusted.

The adjustment of angle of attack 14 shown on the left-hand side and at the center in FIG. 2 is possible with a comparatively simple actuating mechanism 9 and is typically sufficient for format adaptation. The variant shown on the right-hand side in FIG. 2 for changing distance 15 between guide jaws 8, however, is alternatively or additionally also conceivable.

FIG. 3 shows an embodiment of the method for format adaptation of container guides 7. According thereto, actuating mechanism 9 comprises a first coupling element 10 (shown on the right-hand side) for increasing guide width 13 and a second coupling element 10 (shown on the left-hand side) for reducing guide width 13. For format adaptation of container guide 7, either first or second coupling element 10 is then moved over adjustment station 12 and is actuated in particular mechanically by operating element 11.

It is shown there by way of example that actuating mechanism 9 can comprise at least one ratchet mechanism 9a for changing guide width 13 by actuating at least one coupling element 10 in a unidirectional manner (presently upwards) and in particular incrementally. At the upper end of the actuation region, ratchet mechanism 9a could then, for example, disengage and coupling element 10 could be moved back to the lower end of the actuation region by spring tension. Ratchet mechanism 9a could then again perform an actuation motion, possibly with a latching action.

Ratchet mechanisms 9a would also be conceivable in which a switchover mechanism is triggered at the end of their actuation region and reverses the freewheeling direction and blocking direction of ratchet mechanism 9a in order to alternately increase and decrease guide width 13 by unidirectional actuation of the actuating mechanism 9.

In the embodiment of FIG. 3, operating element 11 of adjustment station 12 performs an adjustment motion 20. This is to be understood as meaning that the position of operating element 11 approached towards coupling element 10 corresponds directly to the position of guide jaws 8. The adjustment of guide width 13 is therefore greater, the greater the adjustment motion 20 of operating element 11.

In contrast, a further embodiment is indicated in FIG. 4 in which operating element 11 of adjustment station 12 performs an anchoring motion 21 for anchoring coupling element 10 in a stationary manner on extended operating element 11. Carriage 2 then conducts an adjustment run 22 which adjusts guide width 13 in accordance with the travel distance covered.

Ratchet mechanism 9a shown in FIG. 4 would in principle not be required with the type of anchoring shown. The anchoring of coupling element 10 by way of operating element 11, however, would also be conceivable in the sense of a stop on one side (indicated by dashed lines). Carriage 2 would then move towards correspondingly extended operating element 11 until coupling element 10 abuts. Adjustment run 22 is then conducted. In this case, unidirectional actuation of actuating mechanism 9 would be possible with ratchet mechanism 9a.

FIG. 5 shows a further embodiment in which adjustment station 12 can be dispensed with. The adjustment motion is generated by at least one adjustment run 22, 23 in that two carriages 2, 24 are moved towards one another with coupling element 10 clamped therebetweern.

In the example shown, container guide 7 of a first carriage 2 is to be adjusted with the aid of a second carriage 24. For this purpose, coupling element 10 of first carriage 2 and operating element 11 of second carriage 24 are moved towards one another and at least one of adjustment runs 22, 23 is then conducted. For example, second carriage 24 is then at rest.

Operating element 11 in this case is present on carriages 2, 24 themselves, for example, in the form of a suitable counterpart to coupling element 10 or simply in the form of a front/rear face side of carriage 2. It is there irrelevant whether operating element 11 is driven against corresponding coupling element 10 or vice versa. In the example in FIG. 5 as well, a ratchet mechanism 9a is particularly advantageous for unidirectional actuation of the actuating mechanism 9.

Figure 6:
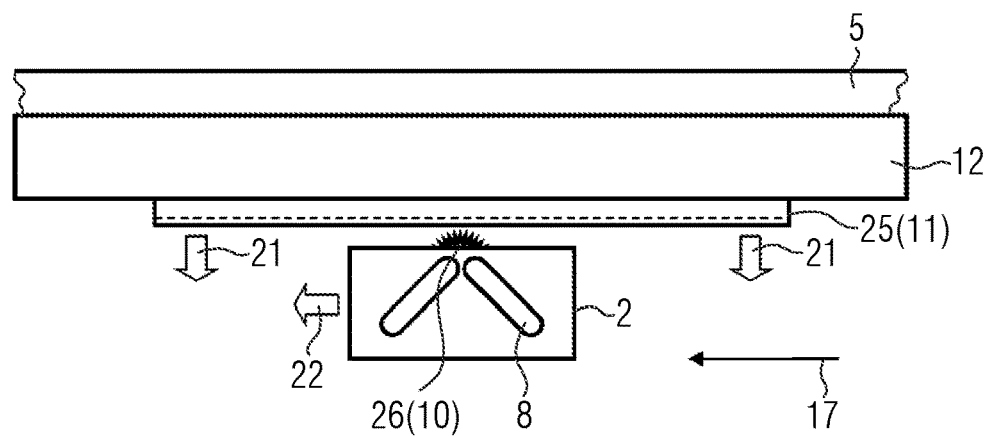
FIG. 6 shows a schematic representation of a fourth embodiment of the method.

Similar to the embodiment according to FIG. 4, a variant shown schematically in FIG. 6 is also conceivable in which 12 adjustment mechanism 12 is arranged in the region of guide rails 5 (only indicated in a simplified manner for the sake of clarity). Operating element 11 could then be, for example, a toothed strip 25 that is integrated to be movable in one of guide rails 5 or embedded between them. Adjustment station 12 makes toothed strip 25 engage preferably by way of an anchoring motion 21 with a coupling element 10 formed on carriage 2, for example, a sprocket 26. For example, toothed strip 25 could be magnetically moved a few millimeters in the direction of carriage 2 and thus be coupled to sprocket 26 or similar coupling element 10.

In order to adjust container guide 7, carriage 2 is then moved for an adjustment run 22 along toothed strip 25 which has been extended in this way. After the adjustment, toothed strip 25 is retracted again and thereby disengaged. Carriage 2 can then move to the subsequent supply of a container.

Such an adjustment of container guide 7 is preferably conceivable in a special adaptation section of linear motor system 1, for example, in an adjustment station, on a special side lane of linear motor system 1 or the like, in order to increase the number of adjustment stations 12 and operating elements 11 required overall for format adaptation, for example, the toothed strips that can be moved in this manner.

Figure 7:
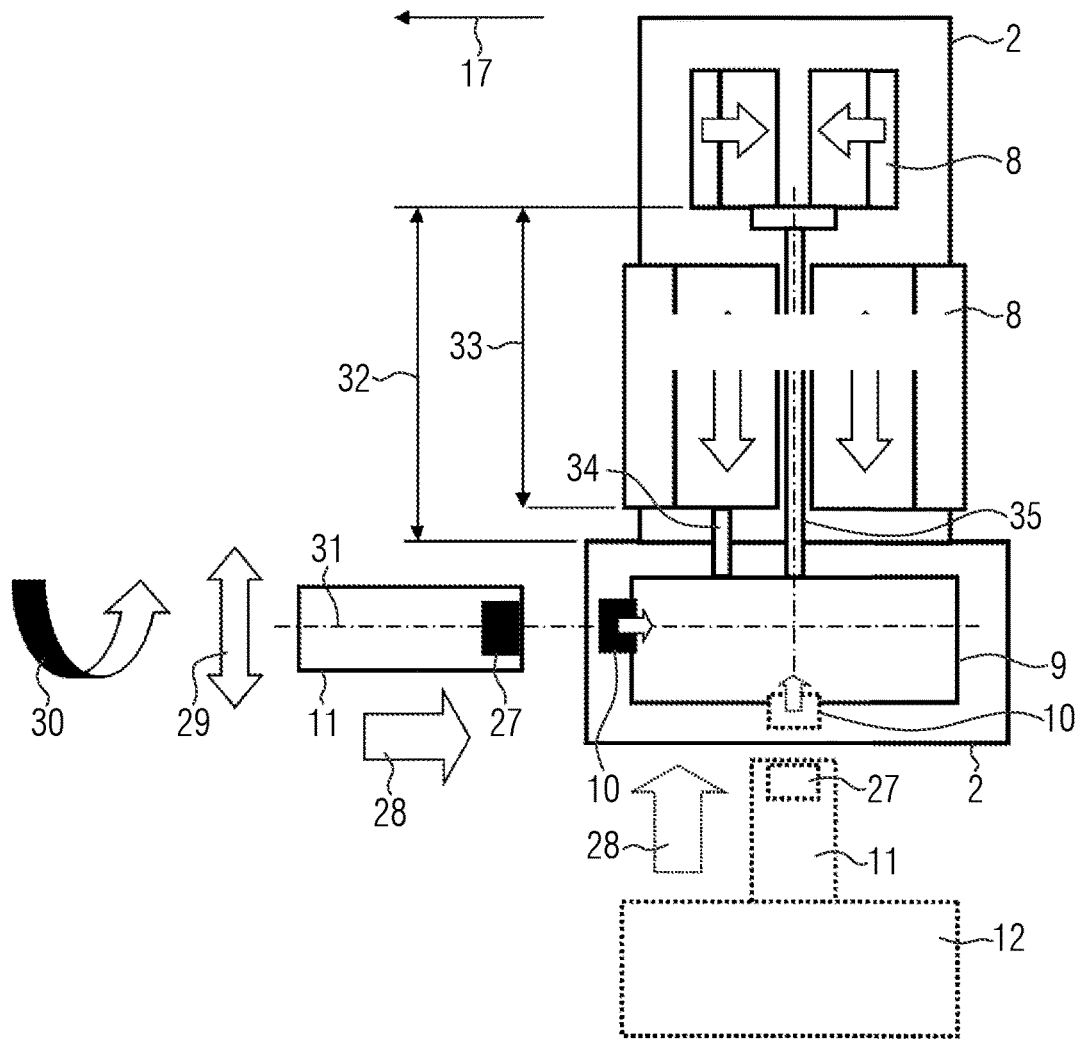
FIG. 7 shows a schematic representation of a fifth embodiment of the method.

FIG. 7 schematically shows further optional aspects of the format adaptation according to the invention, namely, firstly, non-contact actuation of container guides 7 by magnetic force, which is advantageous from a hygienic perspective, and, secondly, separate actuation motions of lower guide jaws 8 for body cross-sections of the containers and upper guide jaws 8 for associated neck/shoulder cross-sections.

Accordingly, operating element 11 then comprises a magnet 27, for example, a permanent magnet with differently magnetized partial circumferential sections and interacts with a magnetically reactive coupling element 10 in carriage 2 for actuating the actuating mechanism 9 and, if necessary, also for activating it.

Magnetic operating element 11 can preferably be moved in several degrees of freedom for different functions, for example, to perform an approach motion 28 to carriage 2 which is used to unlock a locking mechanism for coupling element 10 and/or to couple it to actuating mechanism 9. A preferably vertical stroke 29 and/or a rotational motion 30 with respect to a longitudinal axis 31 of operating element 11 and/or magnet 27 are also possible for adjusting lower guide jaws 8 for body cross-sections and/or upper guide jaws 8 for associated neck/shoulder cross-sections of the containers.

The preferably vertical stroke 29 of operating element 11 and of magnet 27 can be transmitted from coupling element 10 to actuating mechanism 9, for example, for adjusting a height level 32 of lower and/or upper guide jaws 8 relative to carriage 2. Correspondingly, a vertical distance 33 between guide jaws 8 arranged one above the other can be adjusted by way of stroke 29.

Rotational motion 30 of operating element 11 and magnet 27 can be transferred to actuating mechanism 9 accordingly for adjusting guide width 13 of existing guide jaws 8, for example, lower guide jaws 8 for body cross-sections and/or for upper guide jaws 8 for associated neck/shoulder cross-sections, as has already been described for the other embodiments.

As indicated on the left-hand side in FIG. 7, magnetic operating element 11 can be approached towards carriage 2 from the rear or the front, for example, by way of a movable or stationary adjustment unit (not shown). However, magnetic actuation from below is also conceivable by way of a stationary adjustment station 12 indicated by way of example.

For the drive-coupling of magnetically reactive coupling element 10 to guide jaws 8, actuating mechanism 9 can comprise, for example, a linear guide 34 and/or an eccentric guide 35.

After the format adaptation of container guide 7 has been completed, actuating mechanism 9 can again be locked/inactivated by reversing approach motion 28 and thereby by releasing the magnetic coupling of operating element 11 with its magnet 27, for example, by way of a locking mechanism that automatically springs back.

This format adaptation triggered magnetically and in a non-contact manner eliminates the need for using hygienically problematic actuation mechanisms with tooth elements, spindle elements, or the like.

The adjustment of guide jaws 8 is in principle possible three-dimensionally, for example, separately along mutually orthogonal axes (longitudinal, transverse, vertical to the direction of transport) or combinations thereof. Height adjustment for the adaptation to lower/higher containers and/or a width adjustment for the adaptation to slimmer/more belly-shaped container contours is particularly practical. In principle, all format-specific parts on carriage 2 can be configured in a correspondingly adaptable manner, for example, as neck handling clamps with an adjustable opening width and/or contour.

Coupling elements 10 can also be associated with different (pairs of) guide jaws 8 and/or actuation functions. First coupling element 10 shown in FIG. 3 for increasing guide width 13 and second coupling element 10 for reducing guide width 13 could, for example, also be associated with different guide jaws 8 instead of different adjustment directions. First coupling element 10 could then be associated with a lower pair of guide jaws 8 and second coupling element 10 with an upper pair of guide jaws 8, or vice versa.

This means that the upper and lower level of container guide 7, if present, can preferably be adjusted separately from one another. This can be used both for the separate adjustment of the upper and lower guide widths 13 of guide jaws 8 as well as for the separate adjustment of an upper and lower height level 32 of guide jaws 8 and therefore also for the adjustment of a vertical distance 33 between upper and lower guide jaws 8.

In the case of variants with guide jaws 8 arranged one above the other, adjustment of upper and lower guide jaws 8 independently of one another can be useful or even necessary. For this purpose, it is conceivable that operating element 11 engages at different points on carriage 2, i.e. then typically also on different coupling elements 10. However, it is also conceivable that different (pairs of) guide jaws 8 are adjusted consecutively at one point on carriage 2 in that operating element 11 is made to engage in an incremental manner with coupling elements 10 and/or gears of actuating mechanism 9 arranged one on top of the other/one inside the other.

For example, operating element 11 could execute a first stroke to couple coupling element 10 in a positive-fit manner to a first gear in actuating mechanism 9, and then a second stroke to couple coupling element 10 in a positive-fit manner to a second gear in actuating mechanism 9. It would therefore be conceivable to select the actuating function by extending operating element 11, for example, a shaft, to different widths and to adjust the respective actuating position of guide jaws 8 selected in this manner by rotating operating element 11, i.e., for example the shaft.

All the embodiments shown have in common that the adjustment of guide width 13 is effected by a relative motion of coupling element 10 in relation to the mounting of guide jaws 8 on carriage 2. The differences lie primarily in the arrangement and the function of operating element 11 for actuating or for anchoring actuating mechanism 9.

Retaining clips 6 and guide rollers 4 have been omitted in FIGS. 3 to 7 since they do not play a special role in the function of passive actuating mechanism 9 as a drive-coupling of guide jaws 8 to an operating element 11 actively acting from the outside.

Adjustment runs 22, 23 can be conducted by suitable programming with linear motor system 1 by way of the control functions present for the transport function of linear motor system 1.

The adjustment of guide width 13, height level 32, and/or vertical distance 33 can be carried out on a shunting stretch (not shown) for empty carriages 2 that is connected to a transport section of linear motor system 1 by way of at least one track switch. Since no container transport is necessary there, the transport function of carriages 2 or a possible collision with containers would not need to be taken into account in the configuration and arrangement of an adjustment station 12 and its operating element 11 as well as coupling elements 10.

Coupling elements 10 could, in principle, execute any rotational motion, linear motion, and/or pivoting motion, as well as combinations of these basic types of motion. An example of this is a combined rotational motion and linear motion of a spindle drive or the like. Coupling elements 10 in the form of linearly displaceable bolts are particularly practical.

Comparatively simple stroke motions at adjustment station 12 suffice for anchoring coupling elements 10 by way of operating element 11. Since respectively adjusted guide width 13 of container guides 7 is basically known in the control system of linear motor system 1, coupling elements 10 of carriages 2 can be driven at any time in a matching manner into the actuating region of operating elements 11 for the subsequent format adaptation.

In principle, any anchoring mechanisms are there conceivable, such as, for example, combinations of hooks and eyes, projections and depressions, bolts and bores or similar positive-fit connections.

An actuation of coupling elements 10 from below is advantageous for a collision-free arrangement of adjustment station 12 below a transport path of the containers. Coupling elements 10 to be actuated in/opposite to direction of travel 17 are particularly advantageous for conducting adjustment runs 22, 23 with carriages 2, 24.

In principle, however, actuation directions deviating therefrom would also be conceivable for coupling elements 10, such as, for example, transverse to direction of travel 17.

Carriages 2 can be configured both for the suspended transport by way of retaining clips 6 for the neck finish/neck regions of the container as well as for standing transport by way of lower guide elements 8c, such as support plates, for the base regions of the containers.

Retaining clips 6 are adjusted, for example, when the format between narrow-necked bottles and wide-necked bottles is changed.

With the method described and linear motor system 1 described, flexible format adaptation of carriages 2 is possible without exchanging retooling parts This minimizes both storage and personnel costs as well as production interruptions and sources of error. In addition, the format adaptation described is in principle also possible in the event of increased hygienic requirements.

The invention claimed is:

1. A method for format adaptation of carriages for a transportation of containers, on a linear motor system, where container guides present on said carriages are adapted to a cross-section of a neck, shoulder and/or body of said containers by adjusting a guide width of said container guides in an automated manner between guide jaws which in relation to a direction of travel are leading and trailing guide jaws and/or by adjusting a vertical distance between guide jaws arranged one above the other, wherein an operating element is approached in an automated manner by way of at least one electronically, pneumatically and/or hydraulically controlled drive toward said respective carriage and thereby brought into operative connection with an actuating mechanism coupled to said guide jaws to enable the format adaptation, and wherein actively driven components of the at least one drive are arranged outside the carriages at at least one of an adjustment station arranged in a region of the linear motor system and in stators of the linear motor system.

2. The method according to claim 1, where said carriages are driven into a region of said adjustment station, and said adjustment station performs an adjustment motion with said operating element for adjusting said guide jaws.

3. The method according to claim 1, where said guide width is adjusted by changing a horizontal angle of attack between said guide jaws and/or by displacing said guide jaws in/opposite to said direction of travel of said carriage.

4. The method according to claim 1, where said carriages are temporarily diverted to a shunting section of said linear motor system for format adaptation.

5. A method for format adaptation of carriages for a transportation of containers, on a linear motor system, where container guides present on said carriages are adapted to a cross-section of a neck, shoulder and/or body of said containers by adjusting a guide width of said container guides in an automated manner between guide jaws which in relation to a direction of travel are leading and trailing guide jaws and/or by adjusting a vertical distance between guide jaws arranged one above the other, where an operating element is approached in an automated manner toward said respective carriage and thereby brought into operative connection with an actuating mechanism coupled to said guide jaws, and where said operating elements are arranged on said carriages, and two carriages move onto one another in such a way that said actuating mechanism and therefore said guide jaws of one carriage are adjusted by said operating element of said other carriage.

6. A method for format adaptation of carriages for a transportation of containers, on a linear motor system, where container guides present on said carriages are adapted to a cross-section of a neck, shoulder and/or body of said containers by adjusting a guide width of said container guides in an automated manner between guide jaws which in relation to a direction of travel are leading and trailing guide jaws and/or by adjusting a vertical distance between guide jaws arranged one above the other, where an operating element is approached in an automated manner toward said respective carriage and thereby brought into operative connection with an actuating mechanism coupled to said guide jaws, and where said carriages are driven into a region of an adjustment station, said adjustment station brings said operating element to a position for stationary anchoring of a coupling element that is drive-coupled to said actuating mechanism, and said carriage conducts an adjustment run in this regard which is transmitted by said actuating mechanism to said guide jaws.

7. A linear motor system for the transportation of containers, comprising:
individually driven carriages with container guides, each comprising: guide jaws that are leading and trailing with respect to said direction of travel and an actuating mechanism for adjusting a guide width for said containers between said guide jaws, and/or guides jaws arranged one above the other, and an actuating mechanism for adjusting a vertical distance between said guide jaws; and
at least one operating element controlled in an automated manner for actuating said actuating mechanism,
where the at least one operating element is approached in an automated manner by way of at least one electronically, pneumatically and/or hydraulically controlled drive toward said respective carriage and thereby brought into operative connection with an actuating mechanism coupled to said guide jaws to enable format adaptation of said guide jaws to different container formats, and where actively driven components of the at least one drive are arranged outside the carriages at at least one of: an adjustment station arranged in a region of the linear motor system;
and in stators of the linear motor system.

8. The linear motor system according to claim 7, where said guide jaws are mounted individually to be pivotable about vertical axes and/or are mounted displaceable against each other parallel to said direction of travel of said carriages.

9. The linear motor system according to claim 7, where said guide jaws comprise vertically aligned guide surfaces for said body cross-sections of said containers as well as clamping elements.

10. The linear motor system according to claim 7, where said actuating mechanism comprises at least one ratchet mechanism.

11. The linear motor system according to claim 7, where said carriages comprise coupling elements, which are to be actuated from below or in/opposite to said direction of travel and which are drive-coupled to said actuating mechanism.

12. The linear motor system according to claim 7, where said carriages comprise rotatable coupling elements, which are accessible transverse to said direction of travel and drive-coupled to said actuating mechanism.

13. The linear motor system according to claim 7, where said adjustment station is arranged in a region of a track for said carriages for motorized actuation or anchoring of a coupling element which is drive-mounted on said carriage and coupled to said actuating mechanism.

14. The linear motor system according to claim 7, where said operating element and said coupling element are configured for a magnetic force-fit for unlocking said actuating mechanism by approaching said operating element and for driving said actuating mechanism by a stroke and/or a rotation of said operating element.

15. The linear motor system according to claim 7, wherein the containers are bottles.

16. The linear motor system according to claim 9, wherein the clamping elements press said containers against said guide surfaces in a resilient manner.

17. The linear motor system according to claim 10, wherein the at least one ratchet mechanism incrementally increases and reduces said guide width and/or said vertical distance.

18. The linear motor system according to claim 11, wherein the coupling elements are in the form of displaceable bolts.

19. The linear motor system according to claim 12, wherein the rotatable coupling elements are in the form of gears.

* * * * *